United States Patent
Hasegawa

(10) Patent No.: US 6,597,875 B2
(45) Date of Patent: Jul. 22, 2003

(54) IDENTIFYING APPARATUS, APPARATUS TO BE IDENTIFIED, IDENTIFYING METHOD, AND PRINTING APPARATUS

(75) Inventor: Satoshi Hasegawa, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/953,733

(22) Filed: Sep. 17, 2001

(65) Prior Publication Data

US 2002/0041766 A1 Apr. 11, 2002

(30) Foreign Application Priority Data

Oct. 6, 2000 (JP) ........................................ 2000-307969

(51) Int. Cl.[7] .............................................. G03G 15/00
(52) U.S. Cl. .......................................... 399/12; 399/24
(58) Field of Search ............................... 399/24, 12, 13

(56) References Cited

U.S. PATENT DOCUMENTS 4,961,088 A  10/1990 Gilliland et al.
5,053,816 A  * 10/1991 Takahashi ..................... 399/12
5,272,503 A  12/1993 LeSueur et al.
6,271,928 B1 * 8/2001 Bullock et al. ............. 358/1.16

FOREIGN PATENT DOCUMENTS

| JP | 2000162929 | * | 6/2000 |
| JP | 2000347552 | * | 12/2000 |
| JP | 2001356654 | * | 12/2001 |
| WO | WO 98/04414 | * | 2/1998 |

* cited by examiner

Primary Examiner—Quana M. Grainger
(74) Attorney, Agent, or Firm—Frishauf, Holtz, Goodman & Chick, P.C.

(57) ABSTRACT

In a process unit, an encoder encodes a code into a response code by a logic in which identification information output from a CPU of a main unit is set and then returns the response code to the main unit. The logic of the encoder can be rewritten. The logic is set as a first logic at the time of shipment and it is rewritten as a second logic under the control of the CPU after the start of use. In the main unit, encoders encode identification codes into first and second specific codes by the first and second logics, respectively, and collators collate these specific codes with the response code. The CPU identifies a status of the process unit according to whether they coincide with each other or not.

15 Claims, 2 Drawing Sheets

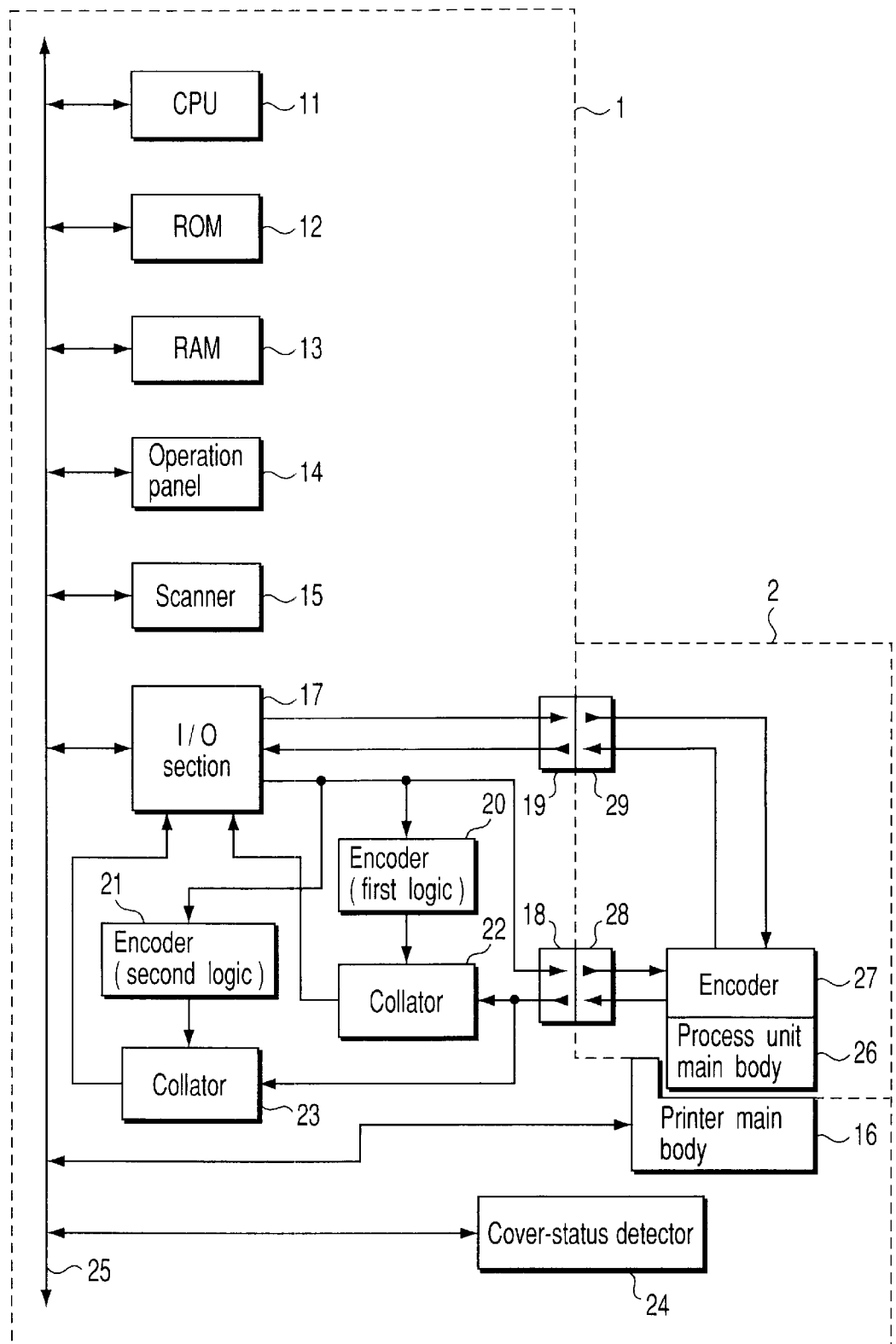
F I G. 1

IDENTIFYING APPARATUS, APPARATUS TO BE IDENTIFIED, IDENTIFYING METHOD, AND PRINTING APPARATUS

CROSS-REFERENCE TO RELATED APPLICATIONS

This application is based upon and claims the benefit of priority from the prior Japanese Patent Application No. 2000-307969, filed Oct. 6, 2000, the entire contents of which are incorporated herein by reference.

BACKGROUND OF THE INVENTION

1. Field of the Invention

The present invention relates to an identifying apparatus, an apparatus to be identified, an identifying method, and a printing apparatus, which are suitable to monitor the status of replaceable consumable items of an apparatus such as a copying machine, a printer, and a facsimile machine.

2. Description of the Related Art

It is general to employ consumable items such as toner in a copying machine and a printer. For easy user maintenance, the consumable items are unitized; accordingly, they can easily be replaced.

Most consumable-item units are degraded with use and their original performance cannot be delivered when they are used to some extent. To prevent this problem, the following measure has conventionally been taken: The main body of the apparatus monitors the amount of use of a consumable-item unit and inhibits a user from using the unit when its lifetime ends.

It is however general that the amount of use is monitored as the number of prints counted from when a consumable-item unit is inserted. If, therefore, a spent consumable-item unit is inserted, the apparatus will identify it as an unused one and monitor the amount of use thereof. Thus, the used consumable-item unit can be used as a new one, as can be a consumable-item unit counterfeited based on the used one.

To resolve the above problem, a consumable-item unit is formed to include a memory for storing the amount of use thereof. However, such a consumable-item unit can easily be counterfeited as a new one if data of the memory is rewritten.

A consumable-item unit is partly broken mechanically or electrically when it is inserted in the main body of an apparatus, based on which a used consumable-item unit can be distinguished from a new one. However, such a configuration makes it difficult to recycle the used consumable-item units through a regular route.

BRIEF SUMMARY OF THE INVENTION

An object of the present invention is to reliably identify the status of a unit such as the consumable-item unit without being easily counterfeited and easily recycle the consumable-item unit.

The above object is attained by an identifying apparatus to which an apparatus to be identified is freely replaceable, for identifying a status of the apparatus to be identified, the identifying apparatus comprising an input port configured to receive an input signal from the apparatus to be identified; an output port configured to supply an output signal to the apparatus to be identified; an identification code generating section configured to generate an identification code and output the identification code from the output port; a plurality of encoding sections corresponding to a plurality of logics, respectively and each configured to encode the identification code into a specific code by a corresponding one of the logics; a plurality of collators corresponding to the plurality of encoding sections, respectively and each configured to collate the specific code obtained by a corresponding encoding section and the input signal received by the input port with each other; an identifying section configured to identify a status of the apparatus to be identified based on a collation result of the plurality of collators; and a logic rewriting section configured to monitor a use status of the apparatus to be identified based on an identification result of the identifying section and rewrite a logic for encoding the code in the apparatus to be identified at given timing.

The above object is also attained by an apparatus to be identified, which is freely replaceable to an identifying apparatus and whose status is identified by the identifying apparatus, the apparatus to be identified comprising a response code generating section configured to encode an identification code output from the identifying apparatus into a response code by any one of a plurality of logics and supply the response code to the identifying apparatus, thereby allowing a logic for use to be rewritten under control of the identifying apparatus.

The above object is also attained by a method for identifying a status of an apparatus to be identified by an identifying apparatus to which the apparatus to be identified is freely replaceable, the identifying apparatus including an input port configured to receive an input signal from the apparatus to be identified and an output port configured to supply an output signal to the apparatus to be identified, the method comprising: outputting an identification code from the output port; encoding the identification code into a specific code by a corresponding one of a plurality of logics; collating the specific code obtained by the corresponding one of the plurality of logics and the input signal received by the input port with each other; identifying a status of the apparatus to be identified based on a result of collation between the specific code and the input signal; and monitoring a use status of the apparatus to be identified and rewriting a logic for encoding the code in the apparatus to be identified at given timing.

The above object is attained by a printing apparatus in which a consumable item is freely insertable, for printing an image using the consumable item, the printing apparatus comprising: an input port configured to receive an input signal from the consumable item; an output port configured to supply an output signal to the consumable item; an identification code generating section configured to generate an identification code and output the identification code from the output port; a plurality of encoding sections corresponding to a plurality of logics, respectively and configured to encode the identification code into a specific code by a corresponding one of the logics; a plurality of collators corresponding to the plurality of encoding sections, respectively and configured to collate the specific code obtained by a corresponding encoding section and the input signal received by the input port with each other; an identifying section configured to identify a status of the consumable item based on a collation result of the plurality of collators; and a logic rewriting section configured to monitor a use status of the consumable item based on an identification result of the identifying section and rewrite a logic for encoding the code in the consumable item at given timing.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a main part of a digital copying machine according to one embodiment of the present invention.

DETAILED DESCRIPTION OF THE INVENTION

Figure 2:
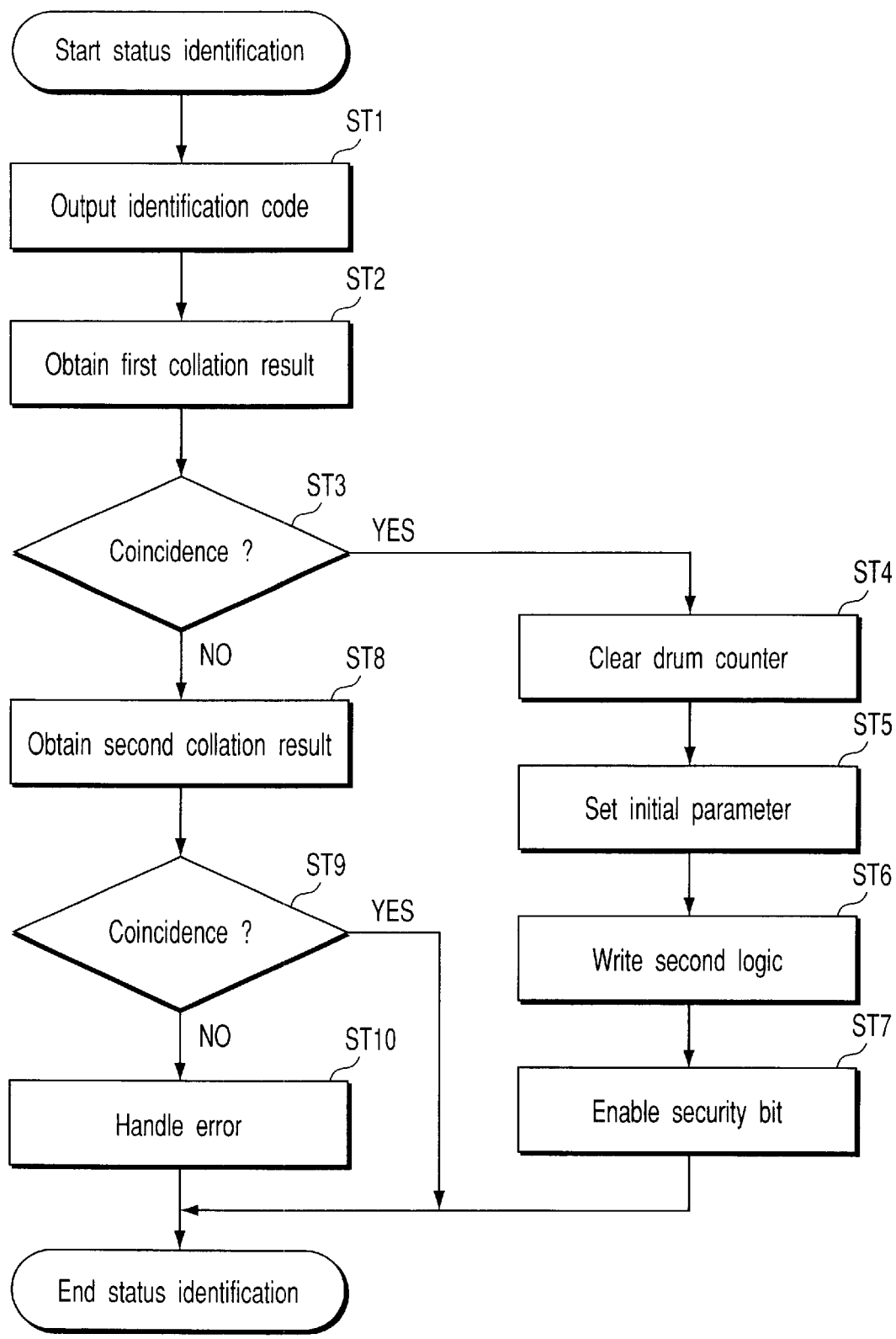
FIG. 2 is a flowchart of a status identification process performed by a CPU of the digital copying machine shown in FIG. 1.

One embodiment of the present invention will now be described with reference to the accompanying drawings.

FIG. 1 is a block diagram showing a main part of a digital copying machine according to the embodiment of the present invention.

AS shown in FIG. 1, the digital copying machine comprises a main unit 1 and a process unit 2. The process unit 2 is formed separately from the main unit 1 and can freely be attached thereto and detached therefrom.

The main unit 1 includes a CPU 11, a ROM 12, a RAM 13, an operation panel 14, a scanner 15, a printer main body 16, an I/O section 17, connectors 18 and 19, encoders 20 and 21, collators 22 and 23, and a cover-status detector 24. Of these sections, the CPU 11, ROM 12, RAM 13, operation panel 14, scanner 15, printer main body 16, I/O section 17, and cover-status detector 24 are connected to each other through a system bus 25.

The process unit 2 includes a process unit main body 26, an encoder 27, and connectors 28 and 29.

The CPU 11 performs a control processing of the respective components in order to realize an operation of the digital copying machine by a software processing based on operation program stored in the ROM 12.

The ROM 12 stores the operation program, and the like.

The RAM 13 is used to store various information items required when that the CPU 11 performs various types of processing.

The operation panel 14 includes a key input portion, display portion, and the like as not shown. The key input portion is configured, for example, using a large number of key switches, and receives various instruction inputs to the CPU 11 by a user. The display portion is configured, for example, using LCD, and displays various information to be notified to the user under control of the CPU 11.

The scanner 15 includes an image sensor, an image processing circuit, and the like, to scan a document to be copied and generate image data indicative of the document.

The printer main body 16 forms an image onto a sheet by a known electrophotographic process. When the printer main body 16 performs the image formation, the attached process unit 2 is used.

The connectors 18 and 19, encoders 20 and 21, and collators 22 and 23 are connected to the I/O section 17. The I/O section 17 outputs signals to the connectors 18 and 19 and encoders 20 and 21 and receives signals through the connector 19 and signals from the collators 22 and 23.

When the process unit 2 is attached to the main unit 1, the connectors 28 and 29 of the unit 2 are connected to the connectors 18 and 19, respectively. The connector 18 has an output port and an input port to supply a signal from the I/O section 17 to the process unit 2 and a signal from the process unit 2 to the collators 22 and 23. The connector 19 has an output port and an input port to supply a signal from the I/O section 17 to the process unit 2 and a signal from the process unit 2 to the I/O section 17.

The encoders 20 and 21 are each supplied with a signal that is input to the process unit 2 from the I/O section 17. The encoders 20 and 21 encode the input signal according to predetermined logics. The encoders 20 and 21 both perform their encoding operations by given logical operations, but the logical operations are done by different first and second logics. In other words, the encoders 20 and 21 are equivalent to a encoding section, respectively.

The collator 22 collates a signal supplied from the process unit 2 through the connector 18 with a signal obtained by encoding the input signal by the encoder 20 to issue collation result information indicating whether both the signals coincide with each other. The collator 23 collates a signal supplied from the process unit 2 through the connector 18 with a signal obtained by encoding the input signal by the encoder 21 to issue collation result information indicating whether both the signals coincide with each other. In other words, the collator 23 is equivalent to a collating section.

The cover-status detector 24 detects an opening/closing status of an open/close cover (not shown) provided at the main unit 1 and notifies the CPU 11 of a detection result by request of the CPU 11. The open/close cover is designed to expose a space of the process unit 2 outside the main unit 1 when the process unit 2 is replaced.

The process unit main body 26 includes consumable items such as a photosensitive drum and a developer unit. The main body 26 is formed like a cartridge such that it can easily be replaced with a new one.

The encoder 27 is attached to the process unit main body 26. The encoder 27 includes a PLD (programmable logic device) and is capable of rewriting its internal logic by the control through the connector 29. The encoder 27 performs a logical operation for a signal supplied through the connector 28 by the preset logic and outputs an operation result to the connector 28. In other words, the encoder 27 is equivalent to a response code generating section.

The CPU 11 executes the software processing based on the operating programs stored in the ROM 12 to serve as an identification code generating section, an identifying section, a logic rewriting section, a use-amount counting section, and a parameter managing section as well as a commonly-known control section in the digital copying machine.

The identification code generating section generates a given identification code for identifying the status of the process unit 2 and supplies it to the connector 18 and the encoders 20 and 21 through the I/O section 17.

The identifying section identifies the status of the process unit 2 based on the collation result information output from the collators 22 and 23.

The logic rewriting section rewrites the logic of the encoder 27 included in the process unit 2 at given timing corresponding to an identification result of the identifying section.

The use-amount counting section counts the amount of use of the photosensitive drum included in the printer main body 16 in order to monitor the amount of use of the process unit 2. The use-amount counting section clears a drum count value when the identifying section identifies the process unit 2 as an unused one.

The parameter managing section manages various parameters in accordance with the amount of use of the process unit 2. The parameter managing section sets initial parameters as various parameters when the identifying section identifies the process unit 2 as an unused one.

An operation of the digital copying machine so configured will now be described. Since a generally known operation of the digital copying machine, such as a copying operation, is the same as that of a prior art one, its description is omitted. Here an operation of identifying a status of the process unit 2 attached to the main unit 1 will be described in detail.

First, the CPU 11 executes a status-identification process, as shown in FIG. 2, at predetermined timing that indicates the possibility of replacement of the process unit 2. This timing corresponds to the cases where a power supply of the digital copying machine is turned on and the open/close cover is closed.

In the status-identification process, the CPU 11 outputs an identification code to the output port of the connector 18 and the encoders 20 and 21 via the I/O section 17 (step ST1). The identification code may have a predetermined bit length and an arbitrary bit array. The CPU 11 generates and outputs an identification code under a predetermined rule such as random numbers are combined with values of years, months, days, hours, minutes, and seconds and the combined values are arrayed in predetermined order.

If the process unit 2 is attached to the main unit 1 and the connector 28 is connected to the connector 18 when the CPU 11 outputs the above identification code through the I/O section 17, the identification code is input to the encoder 27 via the connectors 18 and 28.

Thus, the same identification code is supplied to the encoders 20, 21 and 27 and encoded therein. The code obtained by encoding the identification code in the encoder 20 (referred to as a first specific code hereinafter) and the code obtained by encoding the identification code in the encoder 27 (referred to as a response code hereinafter) are both input to the collator 22 for collation. The code obtained by encoding the identification code in the encoder 21 (referred to as a second specific code hereinafter) and the response code are both input to the collator 23 for collation.

Assume that the first logic is set in the encoder 27 of the normal process unit 2 at the time of shipment and that a security bit is enabled in order to prevent the first logic from being read out illegally.

If, therefore, the process unit 2 is a normal and unused one, the encoder 27 is set to the first logic. In this state, the response code is one obtained by encoding the identification code by the first logic and should coincide with the first specific code output from the encoder 20.

After the CPU 11 outputs the identification code in step ST1, it obtains a collation result (referred to as a first collation result hereinafter) from the collator 22 (step ST2) and confirms whether the result shows a coincidence (step ST3). If the CPU 11 confirms the coincidence, it determines that the process unit 2 attached to the main unit is normal and unused. In other words, the CPU 11 determines that the unused process unit 2 is attached to the main unit 1. In this case, the CPU 11 clears the drum counter for monitoring the amount of use of the process unit 2 (step ST4) and sets initial parameters as various parameters consistent with a new process unit 2 (step ST5).

Subsequently, the CPU 11 accesses the encoder 27 through the I/O section 17 and connectors 19 and 29 to rewrite its logic as the second logic (step ST6). The logic of the encoder 27 in the process unit 2 in use is therefore caused to differ from that in the unused process unit. In order to prevent the second logic from being read out illegally, the CPU 11 enables a security bit (step ST7). The status-identification process ends accordingly.

It is the second logic that is set in the encoder 27 of the normal process unit 2 in use. In the status-identification process, the response code is one obtained by encoding the identification code by the second logic and does not coincide with the first specific code but should coincide with the second specific code.

In this case, the CPU 11 confirms that there is no coincidence in step ST3. The CPU 11 obtains a collation result (referred to as a second collation result hereinafter) from the collator 23 (step ST8) and confirms whether the result shows a coincidence (step ST9). If the CPU 11 confirms the coincidence, it determines that the process unit 2 attached to the main unit 1 is normal and in use. The CPU 11 then completes the present status-identification process without performing any special process.

If, as described above, the process unit 2 is normal and in use, the logic of the encoder 27 is either the first logic or the second logic and the response code should always coincide with either the first specific code or the second specific code. If the CPU 11 then confirms in step ST9 that the second collation result shows a noncoincidence, it determines that the process unit 2 attached to the main unit is not normal or counterfeited and performs a predetermined operation of handling an error of the process unit 2 (step ST10). This error handling is, for example, an operation of inhibiting a printing operation and notifying a user that an unusable process unit 2 is attached to the main unit 1. When the error handling ends, the CPU 11 completes the present status-identification process.

According to the embodiment described above, the encoder 27 provided in the normal, unused process unit 2 performs an encoding operation by the same logic as the encoder 20 provided in the main unit 1 does, and returns the encoded code to the main unit 1 as a response code. The main unit 1 thus identifies the process unit 2 as a normal and unused one based on a coincidence between the response code to be returned from the process unit 2 and the first specific code encoded by the encoder 20.

On the other hand, the encoder 27 provided in the normal process unit 2 in use performs an encoding operation by the same logic as the encoder 21 provided in the main unit 1 does, and returns the encoded code to the main unit 1 as a response code. The main unit 1 thus identifies the process unit 2 as a original one in use based on a coincidence between the response code to be returned from the process unit 2 and the second specific code encoded by the encoder 21.

The main unit 1 identifies the process unit 2 as not a original one, based on the fact that the response signal coincides with neither of the first and second specific codes.

Consequently, the main unit 1 can identify the status of the process unit 2 in which the process unit is normal or not or it is unused or in use, based on a simple comparison between the codes. The main unit 1 can thus be configured very simply. The process unit 2 rewrites the identification code, which is supplied from the main unit 1 by given logic, as a response code. If the identification code varies, the response code does. The process unit cannot be counterfeited even though a specific response code is simply generated.

According to the present embodiment, a PLD is used as the encoder 27. It is thus likely that the set logic will be read out. However, the PLD has a function of inhibiting the readout of logic by enabling the security bit after the logic is written. It is thus possible to prevent unauthorized use of the process unit 2 by illegally rewriting the logic of the encoder 27.

According to the present embodiment, the process unit 2 that is collected and reproduced through a regular route can be reused as a new one by writing the first logic to the encoder 27 and thus recycled easily.

The present invention is not limited to the above embodiment. In the embodiment, the main unit 1 includes an identifying apparatus and the process unit 2 includes an apparatus to be identified to identify the process unit 2 attached to the main unit 1. However, it is not only the process unit 2 that is to be identified. Another unit such as a toner unit can be used as an object to be identified in the present invention. Further, the unit to be identified is not limited to consumable items. For example, an expanded unit such as a memory unit can be used as an object to be identified. The present invention is not limited to a digital copying machine, but can be applied to an apparatus to which two different units are freely attached. Needless to say, the present invention can be applied to an independent identifying apparatus and an apparatus to be identified that are incorporated into a given apparatus.

In the foregoing embodiment, a PLD is used as the encoder 27 to rewrite its internal logic. However, a logical operation circuit for performing a logical operation by the first logic and another logical operation circuit for performing a logical operation by the second logic can be used selectively. These circuits can be configured by hardware circuits without using any PLD. Otherwise, they can be configured by one-chip microcomputers.

Only the first logic and the second logic are used in the above embodiment. However, three or more logics can be used to identify the process unit. Thus, a larger number of states can be identified.

In the above embodiment, the encoders 20 and 21 and collators 22 and 23 are configured by hardware circuits. However, the processing performed by these circuits can be done by the software processing of the CPU 11.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An identifying apparatus to which an apparatus to be identified is freely replaceable, for identifying a status of the apparatus to be identified, the identifying apparatus comprising:

an input port configured to receive an input signal from the apparatus to be identified;

an output port configured to supply an output signal to the apparatus to be identified;

an identification code generating section configured to generate an identification code and output the identification code from the output port;

a plurality of encoding sections corresponding to a plurality of logics, respectively and each configured to encode the identification code into a specific code by a corresponding one of the logics;

a plurality of collators corresponding to the plurality of encoding sections, respectively and each configured to collate the specific code obtained by a corresponding encoding section and the input signal received by the input port with each other;

an identifying section configured to identify a status of the apparatus to be identified based on a collation result of the plurality of collators; and a logic rewriting section configured to monitor a use status of the apparatus to be identified based on an identification result of the identifying section and rewrite a logic for encoding the code in the apparatus to be identified at given timing.

2. The identifying apparatus according to claim 1, wherein the identifying section identifies the apparatus to be identified as a original one when one of the collators determines that the specific code obtained by the corresponding encoding section coincides with the input signal received by the input port.

3. The identifying apparatus according to claim 1, wherein the plurality of logics include two logics of a first logic and a second logic, and the logic rewriting section changes the logic for encoding the code in the apparatus to be identified from the first logic to the second logic.

4. An apparatus to be identified, which is freely replaceable to an identifying apparatus and whose status is identified by the identifying apparatus, the apparatus to be identified comprising a response code generating section configured to encode an identification code output from the identifying apparatus into a response code by any one of a plurality of logics and supply the response code to the identifying apparatus, thereby allowing a logic for use to be rewritten under control of the identifying apparatus.

5. The apparatus according to claim 4, wherein the response code generating section prevents the logic for use from being read out from outside.

6. The apparatus according to claim 4, wherein the response code generating section uses an initial logic in an initial state and allows a logic for use to be returned to the initial logic even after the logic for use is changed to a logic other than the initial logic.

7. The apparatus according to claim 4, wherein the response code generating section is a programmable logic device.

8. A method for identifying a status of an apparatus to be identified by an identifying apparatus to which the apparatus to be identified is freely replaceable, the identifying apparatus including an input port configured to receive an input signal from the apparatus to be identified and an output port configured to supply an output signal to the apparatus to be identified, the method comprising:

generating an identification code and outputting the identification code from the output port;

encoding the identification code into a plurality of specific codes by a plurality of logics;

collating each of the specific codes with the input signal received by the input port;

identifying a status of the apparatus to be identified based on a result of collation between each of the specific codes and the input signal; and monitoring a use status of the apparatus to be identified and rewriting a logic for encoding the code in the apparatus to be identified at given timing.

9. A printing apparatus in which a consumable item is freely insertable, for printing an image using the consumable item, the printing apparatus comprising:
- an input port configured to receive an input signal from the consumable item;
- an output port configured to supply an output signal to the consumable item;
- an identification code generating section configured to generate an identification code and output the identification code from the output port;
- a plurality of encoding sections corresponding to a plurality of logics, respectively and configured to encode the identification code into a specific code by a corresponding one of the logics;
- a plurality of collators corresponding to the plurality of encoding sections, respectively and configured to collate the specific code obtained by a corresponding encoding section and the input signal received by the input port with each other;
- an identifying section configured to identify a status of the consumable item based on a collation result of the plurality of collators; and
- a logic rewriting section configured to monitor a use status of the consumable item based on an identification result of the identifying section and rewrite a logic for encoding the code in the consumable item at given timing.

10. The printing apparatus according to claim 9, wherein the plurality of logics include two logics of a first logic and a second logic.

11. The printing apparatus according to claim 10, wherein the identifying section identifies the consumable item as an unused one when the collation result shows that the specific code obtained by encoding the identification code by the first logic coincides with the input signal received by the input port.

12. The printing apparatus according to claim 11, further comprising a parameter managing section configured to manage a parameter regarding a use of the consumable item and set the parameter to an initial parameter when the identifying section identifies the consumable item as an unused one.

13. The printing apparatus according to claim 11, wherein the logic rewriting section changes the logic for encoding the code in the consumable item when the identifying section identifies the consumable item as an unused one from the first logic to the second logic.

14. The printing apparatus according to claim 13, wherein the identifying section identifies the consumable item as one in use when the collation result shows that the specific code obtained by encoding the identification code by the second logic coincides with the input signal received by the input port.

15. The printing apparatus according to claim 10, further comprising a use-amount counting section configured to count an amount of use of the consumable item and clear a count value of the amount of use when the identifying section identifies the consumable item as an unused one.

* * * * *